A drive mechanism for rotating a plurality of raking arms in a settling tank of a stirring apparatus wherein the drive mechanism includes a pair of diametrically opposed worm gears linked together with a single load sensing device and a novel load balancing means for driving a worm wheel novelly supported on pentaload bearing means.

United States Patent [19]
Moser

[11] 3,847,032
[45] Nov. 12, 1974

[54] TORQUE EQUALIZING DRIVE
[76] Inventor: Harold Bob Moser, 7301 Dale Ct., Westminster, Colo. 80030
[22] Filed: June 20, 1973
[21] Appl. No.: 372,491

Related U.S. Application Data
[63] Continuation of Ser. No. 252,283, May 11, 1972, abandoned.

[52] U.S. Cl. ................................. 74/427, 74/661
[51] Int. Cl. .... F16h 1/16, F16h 35/06, F16h 37/06
[58] Field of Search ....... 74/427, 661, 665 A, 665 C

[56] References Cited
UNITED STATES PATENTS

| | | |
|---|---|---|
| 1,299,593 | 4/1919 | Mathias .............................. 74/427 |
| 1,913,718 | 6/1933 | Morgan .............................. 74/427 |
| 3,152,488 | 10/1964 | Sergan .............................. 74/427 |
| 3,252,349 | 5/1966 | Widdrington .......................... 74/427 |
| 3,330,165 | 7/1967 | Ishikawa et al. ................... 74/427 X |
| 3,390,782 | 7/1968 | Liebowitz ......................... 74/427 X |

*Primary Examiner*—Samuel Scott
*Assistant Examiner*—P. S. Lall

[57] ABSTRACT

A drive mechanism for rotating a plurality of raking arms in a settling tank of a stirring apparatus wherein the drive mechanism includes a pair of diametrically opposed worm gears linked together with a single load sensing device and a novel load balancing means for driving a worm wheel novelly supported on pentaload bearing means.

10 Claims, 6 Drawing Figures

TORQUE EQUALIZING DRIVE

This is a continuation, of application Ser. No. 252,283, filed May 11, 1972, now abandoned.

BACKGROUND OF THE INVENTION

In stirring and thickener structures various means have been utilized for rotating raking arms in a settling tank. The driving mechanisms used include single worm gears, spur gears, or combinations of worm gears and spur gears. The need for increased torque has been met by various method of multiple drives utilizing complicated combinations of worm and spur gears with pneumatic or fluid operated repositioning means for said gears which operate responsively to a plurality of load indicating means to maintain a load balance between the multiple drives. A simplified, inexpensive high torque multiple drive means is desired for low speed thickener structures.

SUMMARY OF THE INVENTION

According to the present invention there is provided a new and novel drive mechanism for rotating a stirring apparatus wherein two worm gear drives are used and novelly synchronized to maintain a balance of the load torque on each drive by a unique means of rotating the worm gear shaft to shift the worm gear thread meshing alignment. A novel use of a pentaload bearing arrangement is utilized to maintain a driving worm wheel supported and aligned with worm gears.

Other provisions of the new and novel drive mechanism for a stirring or thickening apparatus will become apparent when taken in conjunction with the following detailed description and the accompanying drawings wherein.

DESCRIPTION

Figure 1:
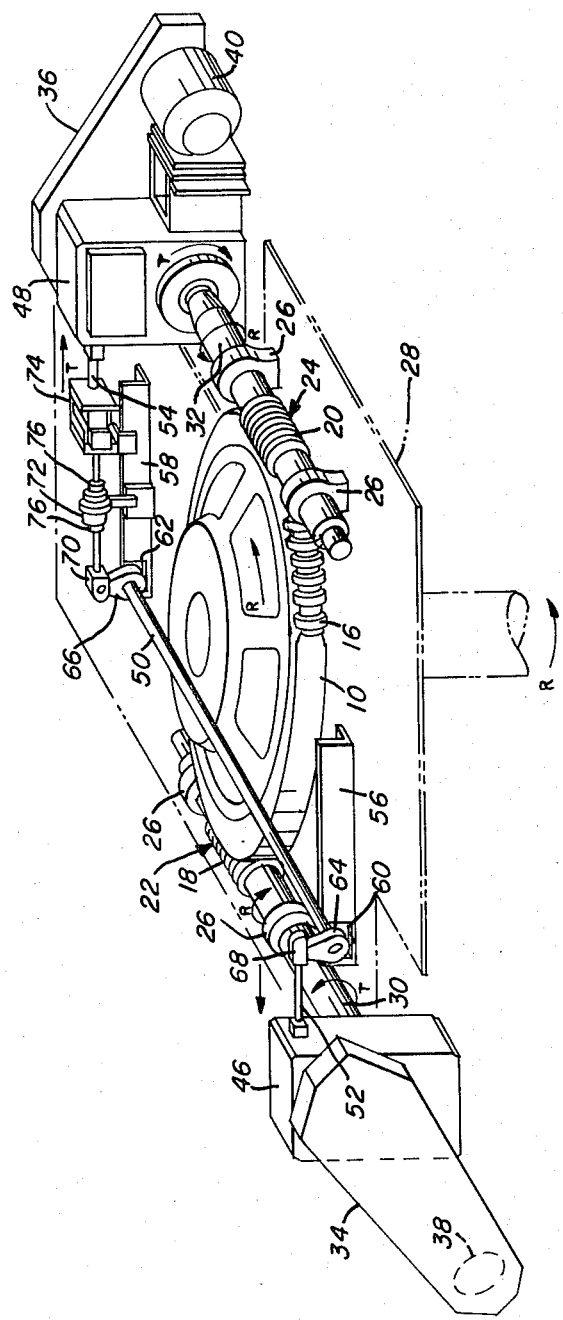
FIG. 1 is a perspective view of a dual worm gear drive mechanism with the load sharing apparatus included.

Referring to FIG. 1 there is shown a dual worm gear drive mechanism as would be utilized in a stirring or thicknener device wherein a driving worm wheel 10 rotates to drive a shaft 12 for rotating suitable rake arms 14 (FIG. 2) in a settling tank (not shown) at low speeds with a torque resistance which varies in accordance with the viscosity of the solution being stirred.

The mechanism includes the worm wheel 10 having a thread 16 on the outer periphery thereof which engages the thread 18 and 20 of a pair of elongated shaft gear worms 22 and 24 respectively spaced on diametrically opposite sides of the worm wheel 10. The worms 22 and 24 are each supported by suitable bearing means 26 secured to suitable platform means 28 with shaft extensions 30 and 32 connected to motor assemblies 34 and 36. The motor assemblies 34 and 36 are identical comprising motors 38 and 40, drive belt means 42 and 44, and reducers 46 and 48 for driving the worms at synchronous speeds. The motor assemblies 34 and 36 are not mounted on the platform 28 but are supported solely by the worm gear shaft extensions 30 and 32 respectively in manner that excessive input torque therefrom would tend to tip or rotate the respective motor assembly relative to the stationary platform 28. As shown in FIG. 1 the threads 18 and 20 of the respective worms 22 and 24 are right-handed threads driven by the respective motors to rotate in the direction indicated by the arrows R such that worm 24 rotates counter clockwise and worm 22 rotates clockwise as viewed in FIG. 1 thereby effecting rotation of the worm wheel 10 and shaft 12 in the counter-clockwise direction indicated by arrows R. With the worms 22 and 24 rotating as indicated, the torque on the reducer 48 of the motor assembly 36 will be in the clockwise direction to the right and the torque on the reducer 46 of the motor assembly 34 will be in the counter-clockwise direction to the left as indicated by the arrows T in FIG. 1.

Connected between the chassis of the reducers 46 and 48 is a torque linkage assembly comprising a reaction arm shaft 50 and two torque rods 52 and 54 suitably supported by mounting brackets 56 and 58 secured to the platform 28. Bearing blocks 60 and 62 are included in the mounting brackets 56 and 58 to receive the reaction arm shaft 50 with reaction arm links 64 and 66 secured as by keying means (not shown) to the shaft 50 to opposite ends adjacent the respective bearing blocks 60 and 62. The links 64 and 66 extend upward to clevis connections 68 and 70 fastened to the respective torque rods 52 and 54.

Any rotating or tilting torque applied to either of the reducers 46 and 48 by the worms 22 and 24 indicated by arrows T, will be transmitted by the respective torque rod and link through the shaft 50 to the opposite link and torque rod to rotate the respective shaft extension 30 or 32 to shift the gear threads and balance the torque as explained hereinafter. The torque rod 52 is connected directly from the link 64 to the reducer 46 while the torque rod 54 has spring biasing means 72 and a load sensing device 74 interposed therein. The spring biasing means 72 includes a plurality of springs (not shown) axially aligned with and encircling the torque rod 54 within a mounting means whereby the rod 54 may float axially therein resisted and limited by the axial biasing forces of the aforesaid springs engaging encircling stop means 76 adjustably located and secured on the rod 54 to thereby absorb sudden shifts of the rod 54 and assist in balancing any torque inequity as explained hereinafter.

The load sensing device 74 such as a well-known load cell is suitably connected to the torque rod 54 connected by the described linkage to both worm gears 22 and 24, the single sensing device 74 will be responsive to the torque applied by both gears thereby providing an overload protection for effecting one or more desired operations such as sounding alarms, shutting off motors and/or raising the rakes of the stirring apparatus.

Figure 2:
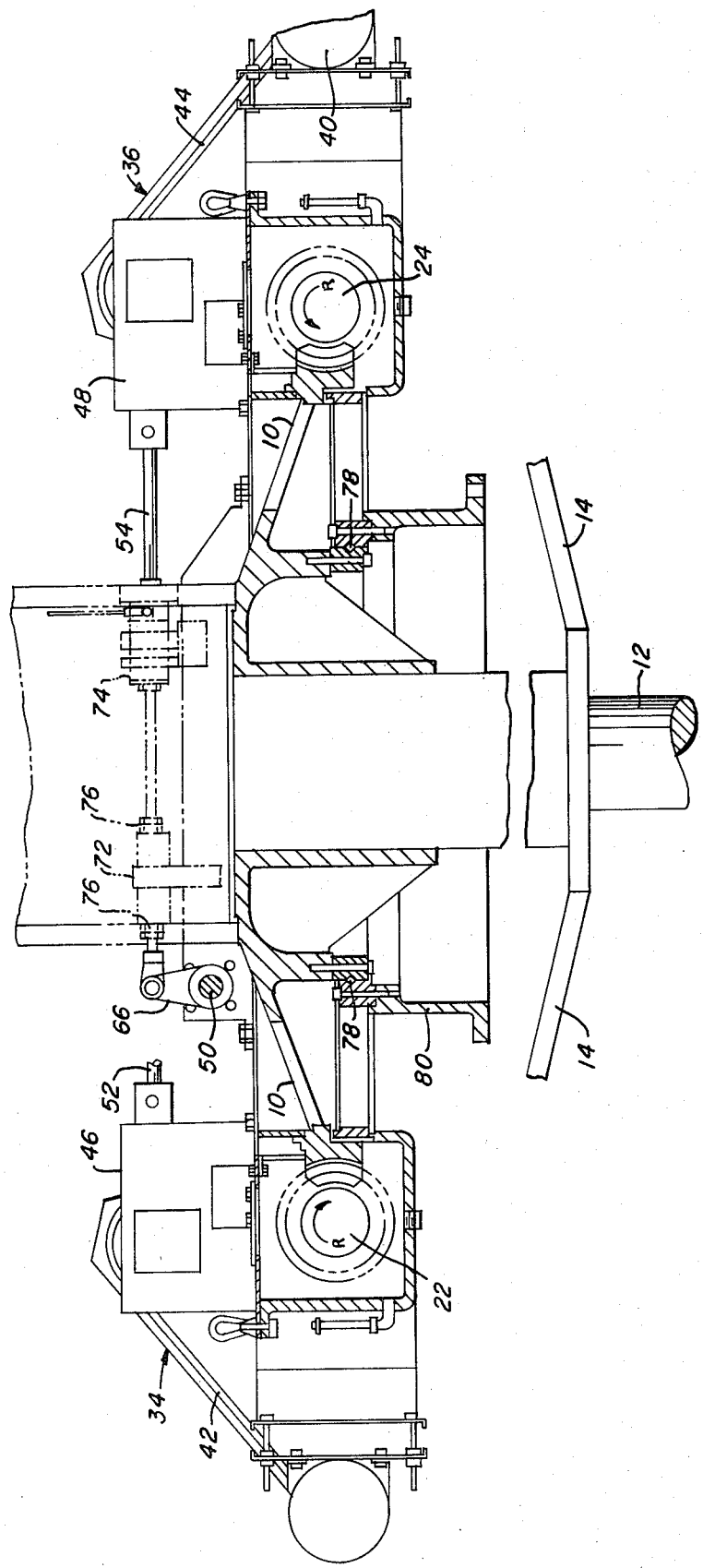
FIG. 2 is a side view of the dual worm gear drive partly in section.
Figure 3:
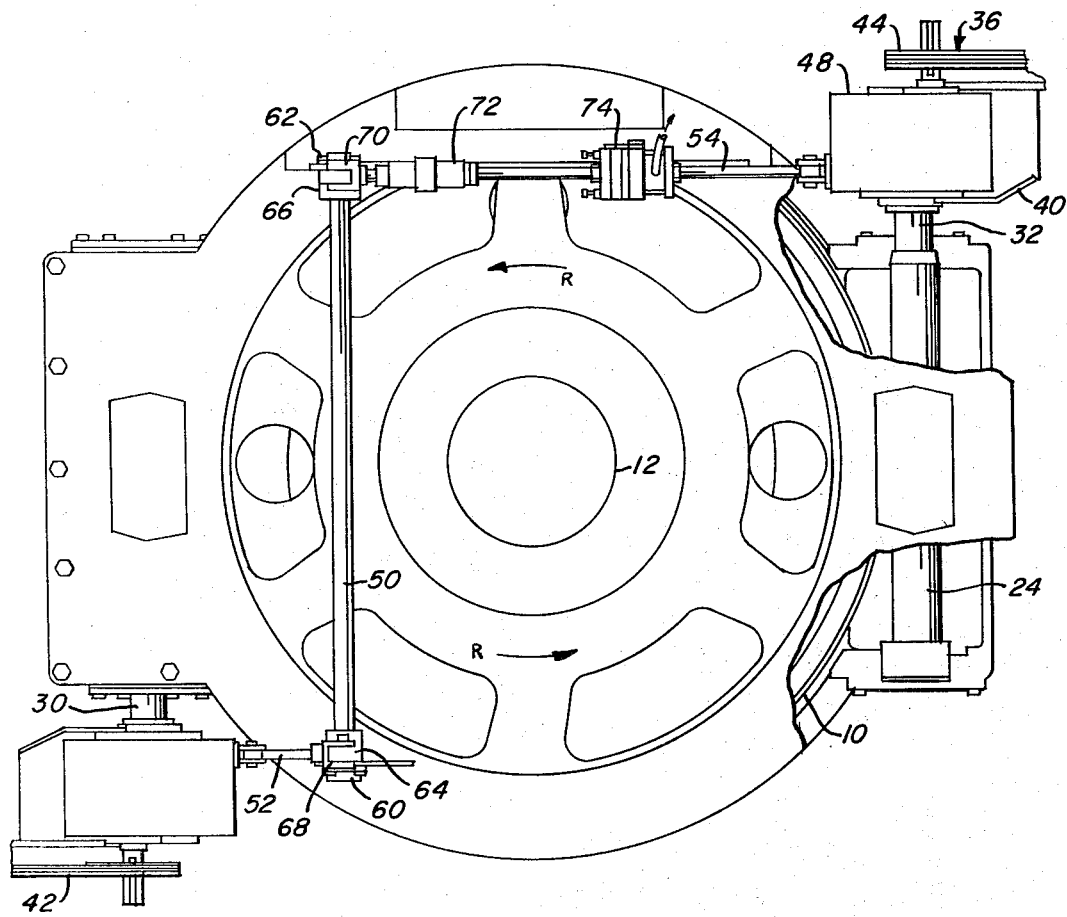
FIG. 3 is an elevational view of the dual worm gear drive partly in section.
Figure 4:
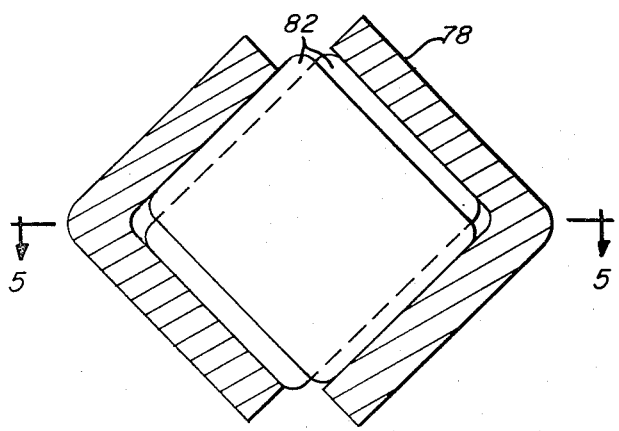
FIG. 4 is a sectional view of a pentaload roller gearing support for a worm wheel.
Figure 5:
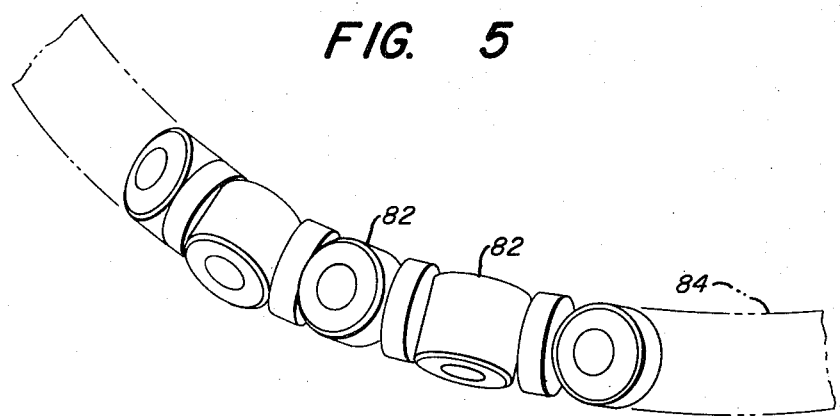
FIG. 5 is a portion of an elevational view of the cage of a roller bearing support.

The worm wheel 10 is mounted so as to be subject to a plurality of different forces including radial forces, vertical up and down forces and tipping or overturning moment forces. For satisfactory operation of a worm drive, the rigidity of the mounting of the worm wheel is of primary importance. To provide a rigid mounting of the worm wheel 10 there is utilized the novel arrangement of pentaload bearings 78 in a so-called "slewing ring" arrangement on a bearing mount 80 as shown in FIG. 2. The pentaload bearings 78 shown in FIGS. 4 and 5 are of a preferred so-called "X type" or "crossed" roller type having rollers 82 alternately perpendicular to each other with intermediate spacers in a bearing cage 84 as shown partially in FIG. 5.

Figure 6:
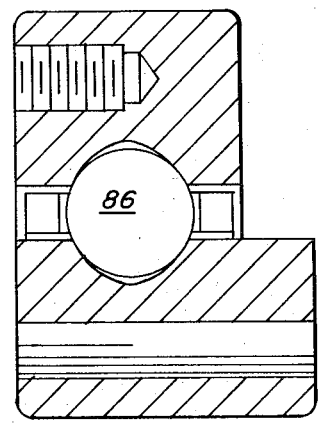
FIG. 6 is a sectional view of a second embodiment of bearing support utilizing ball bearings.

Another embodiment of bearings which may be utilized is the so-called "four point" angular-contact ball bearings as shown in FIG. 6 with only one ball 86 of a plurality in a usual caged mounting.

OPERATION

In operation, the motor assemblies 34 and 36 are operated to rotate the worms 22 and 24 to rotate the worm wheel 10 and the output shaft 12. With no variation in the driving speed of each worm and the worm wheel turning freely, the torque load of the rotating worms are equal and acting on the torque linkage assembly in opposite directions such that the torque rods 52 and 54 are stationary in equilibrium with the single load sensing device 74 indicating the balanced load. If due to a momentary surge or drop of driving speed of one of the motor assemblies, or due to an inaccurate gear tooth spacing; or other reason that would tend to unbalance the load, one of the reducers 46 and 48 will shift about the axis of its respective shaft extension 30 and 32 in the direction of the increased torque. This just described shifting causes the tension in one of the torque rods 52 or 54 (the one connected to the heavier load) to exceed the tension in the opposite torque rod to thereby rotate the links 64 and 66, and the reaction arm shaft 50 in the direction toward the heavier load. The rotation of links 64 and 66 will effect rotation of the reducer connected to the lighter load to rotate the connected worm into a more forceful gear mesh with the worm wheel to take up a greater portion of the load thus tending to balance the load and then permitting the linkage assembly to settle back to its equilibrium state previously described. During the just described balancing of the load, the high biasing forces of the spring biasing means 72 permits only a small degree of shifting of the torque rod 54 prior to balancing of the load, thereby preventing exaggerated shifting of the torque rod 54. The biasing forces of the spring biasing means helps to restore the balance of two different loads and also assists in returing the linkage assembly to its equilibrium position.

Although I have shown and described only one embodiment of the present invention, other embodiments may be comprised of different arrangements of more than two worms and of the torque linkage assembly and connections to rotate the worm shaft extensions during unbalance without departing from the spirit and scope thereof, it is intended that all matter contained in the foregoing description and shown in the accompanying drawings shall be interpreted as illustrative and not in a limiting sense.

What is claimed is:

1. A torque equalizing device for use in a multiple drive mechanism which rotates a main shaft by a plurality of gear worms being in driving engagement with a worm wheel secured to said main shaft, comprising: a driving motor assembly provided for each gear worm and supported on a drive shaft of each of said gear worms to impart driving torque thereto independently of other of said gear worms; each of said motor assemblies having a driving connection with a respective one of said drive shafts for producing a limited rotating movement of said assembly in reaction to the imparted torque; a mechanical linkage connected to each motor assembly and operable to convert said rotating movement to a lineal thrusting force; and reaction arm means interconnecting the linkages of a plurality of motor assemblies to equalize the torque of the gear worms by rotation of respective motor assemblies.

2. A torque equalizing device according to claim 1 wherein said plurality of gear worms comprises two gear worms arranged at diametrically opposite sides of the worm wheel in peripheral driving engagement therewith.

3. A torque equalizing device according to claim 1 wherein the reaction arm means comprises a reaction arm shaft connected to a pair of motor assemblies by respective linkages.

4. A torque equalizing device according to claim 3 wherein each linkage includes a thrust resisting force link and the link of one of said linkages includes a load sensing device.

5. A torque equalizing device according to claim 4 wherein the load sensing devices includes indicator means displaying the degree of lineal thrusting forces.

6. A torque equalizing device according to claim 5 including spring means providing an overload protection.

7. A torque equalizing device according to claim 5 including means regulating operation of said motor assemblies in accordance with the degree of unbalancing torque.

8. A torque equalizing device according to claim 1 wherein the worm wheel is supported in bearing means resisting multi-directional forces.

9. A method of driving a rotary stirring apparatus comprising the steps of: supporting a plurality of motor assemblies each on a separate worm drive shaft; energizing said motor assemblies to impart torque to each of said drive shafts respectively; rotating a driving worm wheel responsive to torques transmitted thereto by said drive shafts; and applying reactive torque of any of said motor assemblies through mechanical linkage connecting said motor assemblies to rotate said motor assemblies about the respective drive shafts thereof to balance said reactive torque of all said motor assemblies.

10. A method of driving a rotary stirring apparatus as defined in claim 9 wherein a linking means is responsive to unbalanced reaction torques of respective motor assemblies to shift a plurality of motor assemblies about the respective drive shafts to balance said shaft torques.

* * * * *